D. B. O'CONNELL.
TRANSMISSION CARRIER.
APPLICATION FILED JUNE 30, 1913.
1,122,024.
Patented Dec. 22, 1914.
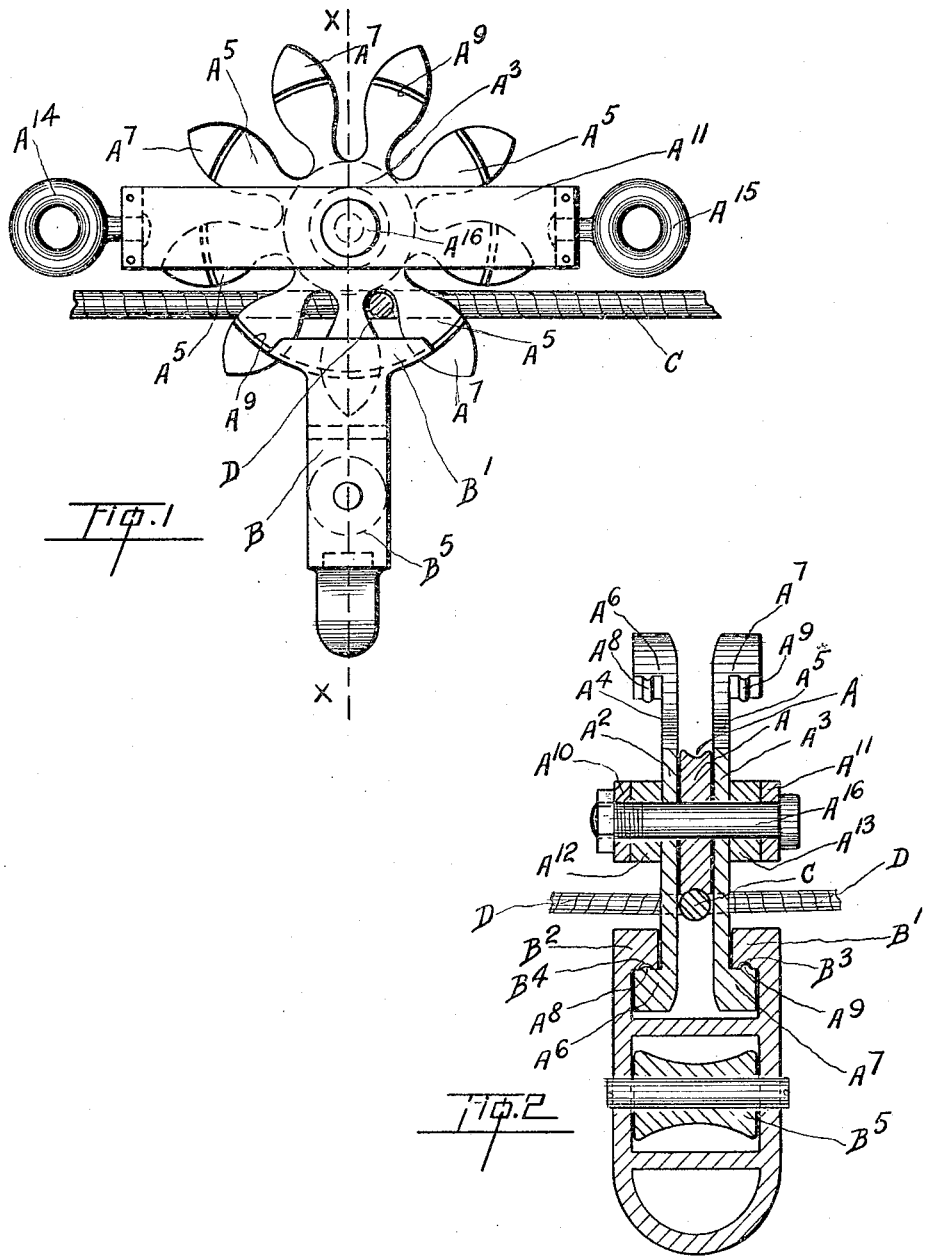
WITNESSES.
James Taylor
Bertram Francis Buxton
INVENTOR.
DANIEL B. O'CONNELL.
BY Fred B. Featherstonhaugh
ATT'Y.

UNITED STATES PATENT OFFICE.

DANIEL BRADLEY O'CONNELL, OF VANCOUVER, BRITISH COLUMBIA, CANADA.

TRANSMISSION-CARRIER.

1,122,024.  Specification of Letters Patent.  Patented Dec. 22, 1914.

Application filed June 30, 1913. Serial No. 776,597.

*To all whom it may concern:*

Be it known that I, DANIEL BRADLEY O'CONNELL, a citizen of the United States, residing at the city of Vancouver, in the Province of British Columbia, Canada, have invented certain new and useful Improvements in Transmission-Carriers, of which the following is a specification.

My invention relates to improvements in transmission carriers, to be used in the transmission by rope of logs and other like materials, and the object of my invention is to devise a carrier which is adapted to effectually clear the cross guy ropes in the course of its travel from one point to another, thus enabling the main transmission rope to be led between terminals any distance apart, which is not at present possible with the carriers in use at the present time.

I attain this object by the construction illustrated in the accompanying drawings, in which—

Figure 1 is a side elevation of my carrier, in position on a rope. Fig. 2 is a cross section on the line X—X in Fig. 1.

Similar letters refer to similar parts throughout the several views.

A is the rope sheave of my carrier.

$A^1$ is the groove for the rope.

$A^2$ and $A^3$ are rotatable disks, fitted one on each side of the rope sheave, and free to revolve independently of the same. These disks have a number of teeth $A^4$ and $A^5$ formed integrally with them, extending radially from, and equally spaced around, their circumferential edges. The pitch of the teeth is such that the space between them is sufficient to freely receive the cross guy rope.

$A^6$ and $A^7$ are outstanding ledges formed on the outer faces of the teeth $A^4$ and $A^5$, toward the points thereof.

$A^8$ and $A^9$ are rounded portions raised on the inner faces of the ledges $A^6$ and $A^7$, as shown in section in Fig. 2, to act as keys for the carrier block to prevent any possibility of the same spreading.

$A^{10}$ and $A^{11}$ are side plates forming the frame for the carrier sheave and disks.

$A^{12}$ and $A^{13}$ are washers fitted as distance pieces between the disks $A^2$ and $A^3$ and the side plates to keep the side plates far enough apart to allow of the disks passing freely between them.

$A^{14}$ and $A^{15}$ are eyebolts fastened to the frame at each end to which cables are attached for pulling the carrier back and forth.

$A^{16}$ is the bolt on which the rope sheave and disks run.

B is the carrier block, having inwardly projecting lugs $B^1$—$B^2$ adapted to engage slidably on the ledges $A^6$—$A^7$. These lugs $B^1$—$B^2$ are designed so that they will always have a bearing on the ledges of two of the teeth $A^4$—$A^5$, as shown in Fig. 1.

$B^3$—$B^4$ are grooves formed in the lugs $B^1$—$B^2$ to engage the raised portions $A^8$—$A^9$, as shown in Fig. 2.

$B^5$ is the carrier block roller.

C is the main transmission rope.

D is the cross guy rope.

In transmission of logs and other like materials at the present time, the length of the span of the main transmission rope is limited on account of the sag of the rope due to its being unsupported between the terminal points. This sag becomes excessive if the span is made too long, and as the present type of carrier requires a clear rope for the whole distance, it is impossible to use cross guy ropes, and consequently the length of clear span is limited by the amount of sag allowable in the rope. This disadvantage is entirely overcome by the use of my carrier, which allows of the main transmission rope being supported by cross guy ropes, and thus the span can be made any length, as will be seen from the description of the operation of my carrier, which is as follows:— When the carrier is moved back or forth along the rope the sheave A alone rotates, the disks $A^2$ and $A^3$ and the carrier block B remaining stationary. When, however, the carrier approaches a cross guy rope, the points of one pair of teeth $A^4$ and $A^5$ will strike the cross guy rope and be engaged by it, so that, as the carrier moves along, the pressure of the rope on the teeth will turn the disks, and the cross guy rope will come into the relative position as shown in Fig. 1, thus allowing the carrier to pass it. The carrier block B remains vertical always and passes clear underneath the rope, the rotation of the disks causing another set of teeth to take the place of those displaced, and as one tooth is displaced another takes its place, so that it will be seen that the carrier block will always be vertically suspended on two of the ledges $A^6$ and $A^7$. This action is the same at each cross guy rope, the disks being rotated every time they strike the rope, and thus allowing the rope to pass between the bottom of the teeth $A^4$ and $A^5$ and the top of the lugs $B^1$ and $B^2$, as shown in Fig. 1. The surfaces of the ledges and of the lugs, where they bear, are free to slide one on the other, thus permitting easy rotation of the disks. The grooves $B^3$ and $B^4$ are made slightly larger than the raised portions $A^8$ and $A^9$ to permit of easy working, at the same time providing for the efficient holding of the carrier block to the disks and thus preventing any possibility of the block spreading and becoming detached from the teeth of the disks. It will be seen, therefore, that I have devised a transmission carrier for the transmission by rope of logs and other like materials, which will, in the course of its travel, effectually clear the cross guy ropes supporting the main rope, thus making it possible to use any length of span and to use cross guy ropes for supporting same.

What I claim as my invention is.

In a transmission carrier, the combination with the frame thereof and the rope sheave rotatably mounted in the frame, of tooth disks mounted in the frame concentric with the sheave and having externally facing outwardly extending shoulders arranged annularly, ribs extending from the shoulders and formed in annular sections, and a carrier block provided with lugs extending inwardly over the external shoulders and provided with recesses fitting the ribs extending from such shoulders, as and for the purpose specified.

Dated at Vancouver, this 13th day of June, 1913.

DANIEL BRADLEY O'CONNELL.

Witnesses:
JAMES TAYLOR,
BERTRAM FRANCIS BUXTON.